US011070721B2

(12) United States Patent
Agrawal

(10) Patent No.: US 11,070,721 B2
(45) Date of Patent: Jul. 20, 2021

(54) INTENT-BASED DYNAMIC CHANGE OF COMPUTE RESOURCES OF VEHICLE PERCEPTION SYSTEM

(71) Applicant: GM Cruise Holdings LLC, San Francisco, CA (US)

(72) Inventor: Pranay Agrawal, San Francisco, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 0 days.

(21) Appl. No.: 16/586,607

(22) Filed: Sep. 27, 2019

(65) Prior Publication Data

US 2021/0099643 A1   Apr. 1, 2021

(51) Int. Cl.
| | | |
|---|---|---|
| *G01S 13/93* | (2020.01) | |
| *G06T 3/40* | (2006.01) | |
| *H04N 5/232* | (2006.01) | |
| *G06K 9/00* | (2006.01) | |
| *H04N 5/262* | (2006.01) | |
| *G01S 13/931* | (2020.01) | |
| *G01S 13/86* | (2006.01) | |

(52) U.S. Cl.
CPC ..... *H04N 5/23225* (2013.01); *G06K 9/00791* (2013.01); *H04N 5/2628* (2013.01); *G01S 13/865* (2013.01); *G01S 13/867* (2013.01); *G01S 13/931* (2013.01); *G01S 2013/9323* (2020.01)

(58) Field of Classification Search
CPC .... G01S 13/931; G01S 13/865; G01S 13/867; G01S 2013/9323; G06K 9/00791; H04N 5/23225; H04N 5/2628
See application file for complete search history.

(56) References Cited

U.S. PATENT DOCUMENTS 8,395,529 B2 * 3/2013 Seder ............... G08G 1/166
340/905
9,549,127 B2 * 1/2017 Laroia .............. H04N 5/2328
(Continued)

FOREIGN PATENT DOCUMENTS

| DE | 102018008024 A1 | 4/2019 |
|---|---|---|
| WO | 2020074195 A1 | 4/2020 |

OTHER PUBLICATIONS

Matzka, S., et al., "Efficient Resource Allocation for Attentive Automotive Vision Systems," IEEE Transactions on Intelligent Transporatation Systems, vol. 13, No. 2; Abstract (1 page); (Jun. 1, 2012).

(Continued)

*Primary Examiner* — Philip P. Dang

(74) *Attorney, Agent, or Firm* — Patent Capital Group

(57) ABSTRACT

The present disclosure provides perception system for a vehicle that includes a plurality of imaging devices for producing images of an environment of the vehicle; a perception filter for receiving the images produced by the imaging devices, wherein the perception filter determines compute resource priority instructions based on an intent of the vehicle and a current state of the vehicle; and a compute module for receiving the compute resource priority instructions from the perception filter and allocating compute resources among the imaging devices in accordance with the compute resource priority instructions.

15 Claims, 5 Drawing Sheets

(56) References Cited

U.S. PATENT DOCUMENTS

| | | | | |
|---|---|---|---|---|
| 10,162,355 B2* | 12/2018 | Hayon | | G05D 1/0219 |
| 10,210,597 B2* | 2/2019 | Scholl | | G06T 7/33 |
| 10,311,312 B2* | 6/2019 | Yu | | G06K 9/627 |
| 10,371,529 B2* | 8/2019 | Roumeliotis | | G06K 9/4604 |
| 10,419,655 B2* | 9/2019 | Sivan | | G06F 3/013 |
| 10,430,680 B2* | 10/2019 | Weimer | | G06K 9/00791 |
| 10,452,927 B2* | 10/2019 | Stojanovi | | G06T 11/60 |
| 10,467,510 B2* | 11/2019 | Albadawi | | H04W 4/33 |
| 10,614,617 B2* | 4/2020 | Fortmann | | G06T 15/205 |
| 10,671,873 B2* | 6/2020 | Wang | | G06K 9/3241 |
| 10,733,465 B2* | 8/2020 | Wang | | G06K 9/4628 |
| 10,783,381 B2* | 9/2020 | Yu | | G08G 1/167 |
| 10,796,192 B2* | 10/2020 | Fernandez | | G06K 9/4652 |
| 2016/0325680 A1* | 11/2016 | Curtis | | H04N 5/2628 |
| 2016/0337426 A1* | 11/2016 | Shribman | | H04L 65/608 |
| 2017/0174227 A1 | 6/2017 | Tatourian et al. | | |
| 2018/0164830 A1 | 6/2018 | Moosaei et al. | | |
| 2018/0276494 A1* | 9/2018 | Fernandez | | G06K 9/6202 |
| 2019/0335100 A1* | 10/2019 | Chen | | B60D 1/36 |
| 2019/0384994 A1 | 12/2019 | Frossard et al. | | |
| 2020/0005050 A1* | 1/2020 | Higuchi | | H04N 7/183 |
| 2020/0025931 A1* | 1/2020 | Liang | | G01S 7/4817 |
| 2020/0177652 A1* | 6/2020 | Halepovic | | H04L 65/4084 |
| 2020/0257301 A1* | 8/2020 | Weiser | | G05D 1/0214 |

OTHER PUBLICATIONS

PCT International Search Report and Written Opinion issued in PCT Application No. PCT/US2019/068850 dated May 12, 2020; 11 pages.

PCT International Search Report and Written Opinion issued in PCT Application No. PCT/US2019/068851 dated May 12, 2020; 11 pages.

USPTO Non-Final Office Action issued in U.S. Appl. No. 16/586,470 dated Feb. 1, 2021, 15 pages.

USPTO Non-Final Office Action issued in U.S. Appl. No. 16/700,704 dated Feb. 12, 2021; 25 pages.

* cited by examiner

INTENT-BASED DYNAMIC CHANGE OF COMPUTE RESOURCES OF VEHICLE PERCEPTION SYSTEM

TECHNICAL FIELD OF THE DISCLOSURE

The present disclosure relates generally to autonomous vehicles (AVs) and, more specifically, to devices and methods for intent-based dynamic change of resolution, region of interest (ROI), and compute resources of a perception system for such vehicles.

BACKGROUND

Accurately and quickly perceiving an autonomous vehicle's environment and surroundings is of the utmost importance for the vehicle; however, these two goals are often in direct opposition to one another. For example, high-resolution imagers, such as computer vision (CV) devices, cameras, and LIDAR devices, provide large amounts of image data that may be used to perceive an autonomous vehicle's surroundings accurately by enabling precise and reliable detection; however, the volume of information provided by such imagers increases the overall latency of the perception system, thereby decreasing the reaction time that may be achieved by the autonomous vehicle.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Figure 1:
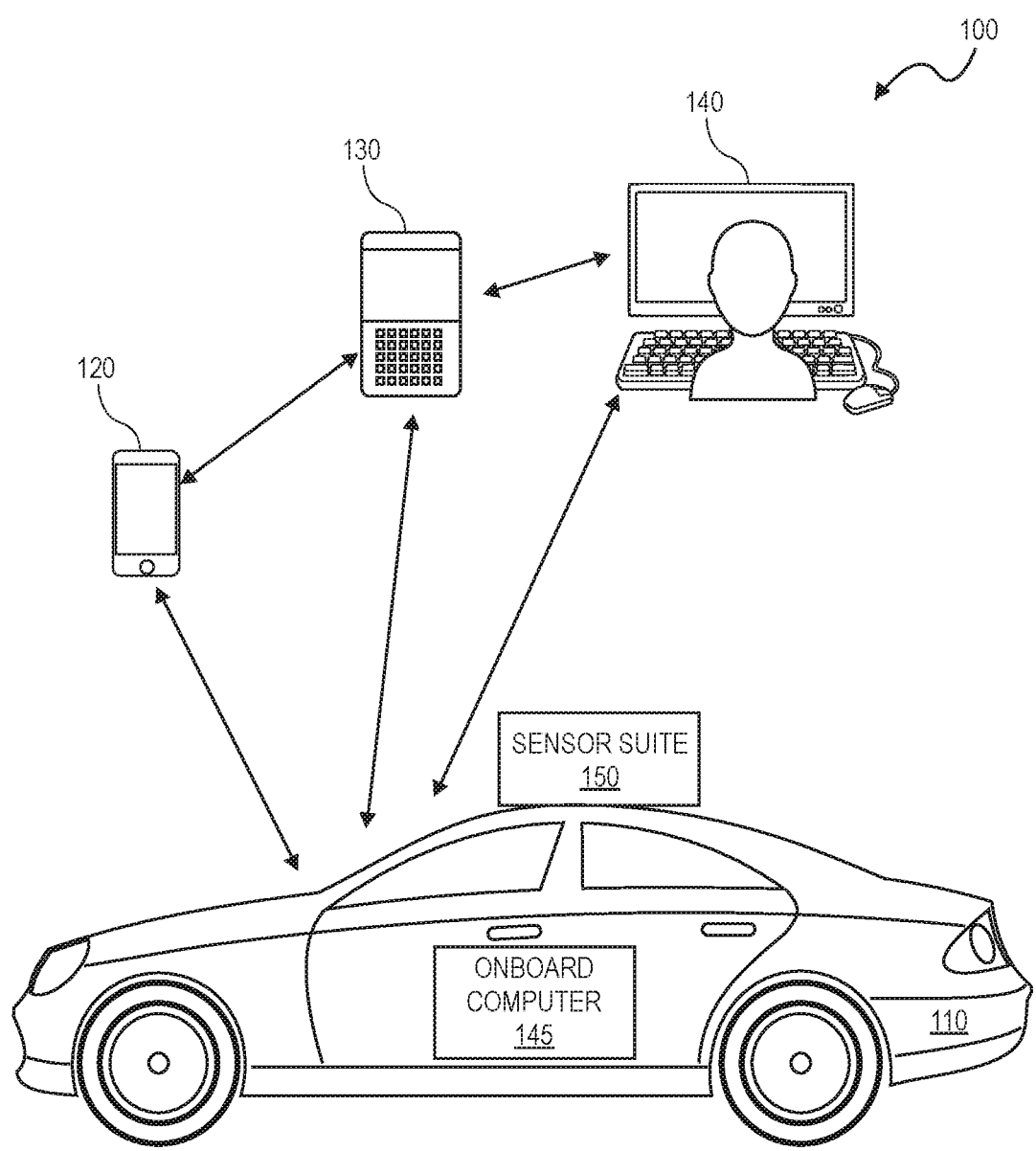
FIG. 1 is a block diagram illustrating an example autonomous vehicle in which a perception system according to some embodiments of the present disclosure may be implemented.

The systems, methods and devices of this disclosure each have several innovative aspects, no single one of which is solely responsible for the all of the desirable attributes disclosed herein. Details of one or more implementations of the subject matter described in this specification are set forth in the description below and the accompanying drawings.

Embodiments of the present disclosure provide a perception system for a vehicle. The perception may include a plurality of imaging devices for producing images of an environment of the vehicle; a perception filter for receiving the images produced by the imaging devices, wherein the perception filter determines compute resource priority instructions based on an intent of the vehicle and a current state of the vehicle; and a compute module for receiving the compute resource priority instructions from the perception filter and allocating compute resources among the imaging devices in accordance with the compute resource priority instructions.

Embodiments of the present disclosure also provide an autonomous vehicle ("AV") including an onboard computer; a sensor suite comprising a plurality of imaging devices; and a perception system. The perception system includes a plurality of imaging devices for producing images of an environment of the AV; a perception filter for receiving the images produced by the imaging devices, wherein the perception filter determines compute resource priority instructions based on an intent of the AV and a current state of the AV; and a compute module for receiving the compute resource priority instructions from the perception filter and allocating compute resources among the imaging devices in accordance with the compute resource priority instructions.

Embodiments of the present disclosure still further provide a method including deploying a plurality of imaging devices for producing images of an environment of a vehicle; receiving by a perception filter the images produced by the imaging devices, wherein the perception filter determines compute resource priority instructions based on an intent of the vehicle and a current state of the vehicle; receiving by a compute module the compute resource priority instructions; and allocating by the compute module compute resources among the imaging device in accordance with the compute resource priority instructions.

Embodiments disclosed herein may be particularly advantageous for dynamically changing the resolution, ROI, and compute resources of a perception system for an autonomous vehicle based on the intent of the autonomous vehicle and the temporal and situational priorities of the autonomous vehicle.

As will be appreciated by one skilled in the art, aspects of the present disclosure, in particular aspects of a perception system for an autonomous vehicle, described herein, may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

Other features and advantages of the disclosure will be apparent from the following description and the claims.

One embodiment is a perception system for an autonomous vehicle. The perception system may receive full resolution information from a plurality of sensors and imagers of the autonomous vehicle, as well as the autonomous vehicle's intent and current state from the autonomous vehicle's planner and control system. Based on the received information, a perception filter of the perception system may dynamically scale and crop the image data from the imagers based on what information is the most important, or relevant, given the autonomous vehicle's current state and intent. For example, if the autonomous vehicle is traveling on a highway at high speed, straight ahead at a long range to the horizon is likely the most important area on which to focus, or region of interest ("ROI"). In such a situation, high-resolution crops of the image data comprising the ROI, rather than the entire image from the imager(s), may be provided to a perception module to perceive the autonomous vehicle's surroundings. In contrast, when driving at low speed on in a city, the surroundings all around the autonomous vehicle are important and may comprise the ROI. In such a situation, low resolution images and sensor data from all around the vehicle may be provided to a perception module to perceive the autonomous vehicle's relevant surroundings.

Additionally, the perception filter of the perception system may scale the compute resources and resolution for the particular sensor based on the state and intent of the autonomous vehicle. In particular, given the nature of autonomous vehicle driving, many systems often compete for limited resources (e.g., CPU and GPU resources). This resource allocation can be changed at real-time depending upon the relative importance of the resource data as dictated by the ROI(s) based on autonomous vehicle state and intent. For example, if the autonomous vehicle is changing lanes at highway speed, the ROI will be in the direction of the intended lane change (e.g., left or right) at a substantial distance. In accordance with features of embodiments described herein, the perception system may allocate greater compute resources to the camera and/or other sensor(s) directed to the identified ROI and simultaneously reduce compute resources of other sensors (i.e., sensors directed to regions other than the ROI) e.g., by reducing the resolution of those sensors. As a result, overall system latency is reduced while operational quality remains high.

As shown in FIG. 1, a system 100 implementing intent-based dynamic change of resolution, region of interest (ROI), and compute resources of a perception system includes an autonomous vehicle 110 including a passenger interface 120, a vehicle coordinator 130, and/or a remote expert interface 140. In certain embodiments, the remote expert interface 140 allows a non-passenger entity to set and/or modify the behavior settings of the autonomous vehicle 110. The non-passenger entity may be different from the vehicle coordinator 130, which may be a server.

The system 100 functions to enable an autonomous vehicle 110 to modify and/or set a driving behavior in response to parameters set by vehicle passengers (e.g., via the passenger interface 120) and/or other interested parties (e.g., via the vehicle coordinator 130 or remote expert interface 140). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110 is preferably a fully autonomous automobile, but may additionally or alternatively be any semi-autonomous or fully autonomous vehicle; e.g., a boat, an unmanned aerial vehicle, a driverless car, etc. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

The autonomous vehicle 110 preferably includes a throttle interface that controls an engine throttle, motor speed (e.g., rotational speed of electric motor), or any other movement-enabling mechanism; a brake interface that controls brakes of the autonomous vehicle (or any other movement-retarding mechanism); and a steering interface that controls steering of the autonomous vehicle (e.g., by changing the angle of wheels of the autonomous vehicle). The autonomous vehicle 110 may additionally or alternatively include interfaces for control of any other vehicle functions; e.g., windshield wipers, headlights, turn indicators, air conditioning, etc.

In addition, the autonomous vehicle 110 preferably includes an onboard computer 145 and a sensor suite 150 (e.g., computer vision ("CV") system, LIDAR, RADAR, wheel speed sensors, GPS, cameras, etc.). The onboard computer 145 functions to control the autonomous vehicle 110 and processes sensed data from the sensor suite 150 and/or other sensors in order to determine the state of the autonomous vehicle 110. Based upon the vehicle state and programmed instructions, the onboard computer 145 preferably modifies or controls driving behavior of the autonomous vehicle 110.

Driving behavior may include any information relating to how an autonomous vehicle drives (e.g., actuates brakes, accelerator, steering) given a set of instructions (e.g., a route or plan). Driving behavior may include a description of a controlled operation and movement of an autonomous vehicle and the manner in which the autonomous vehicle applies traffic rules during one or more driving sessions. Driving behavior may additionally or alternatively include any information about how an autonomous vehicle calculates routes (e.g., prioritizing fastest time vs. shortest distance), other autonomous vehicle actuation behavior (e.g., actuation of lights, windshield wipers, traction control settings, etc.) and/or how an autonomous vehicle responds to environmental stimulus (e.g., how an autonomous vehicle behaves if it is raining, or if an animal jumps in front of the vehicle). Some examples of elements that may contribute to driving behavior include acceleration constraints, deceleration constraints, speed constraints, steering constraints, suspension settings, routing preferences (e.g., scenic routes, faster routes, no highways), lighting preferences, "legal ambiguity" conduct (e.g., in a solid-green left turn situation, whether a vehicle pulls out into the intersection or waits at the intersection line), action profiles (e.g., how a vehicle turns, changes lanes, or performs a driving maneuver), and action frequency constraints (e.g., how often a vehicle changes lanes).

The onboard computer 145 functions to control the operations and functionality of the autonomous vehicles 110 and processes sensed data from the sensor suite 150 and/or other sensors in order to determine states of the autonomous vehicles no. Based upon the vehicle state and programmed instructions, the onboard computer 145 preferably modifies or controls behavior of autonomous vehicles 110. The onboard computer 145 is preferably a general-purpose computer adapted for I/O communication with vehicle control systems and sensor systems, but may additionally or alternatively be any suitable computing device. The onboard computer 145 is preferably connected to the Internet via a wireless connection (e.g., via a cellular data connection). Additionally or alternatively, the onboard computer 145 may be coupled to any number of wireless or wired communication systems.

The sensor suite 150 preferably includes localization and driving sensors; e.g., photodetectors, cameras, RADAR, SONAR, LIDAR, GPS, inertial measurement units (IMUs), accelerometers, microphones, strain gauges, pressure monitors, barometers, thermometers, altimeters, etc.

Figure 2:
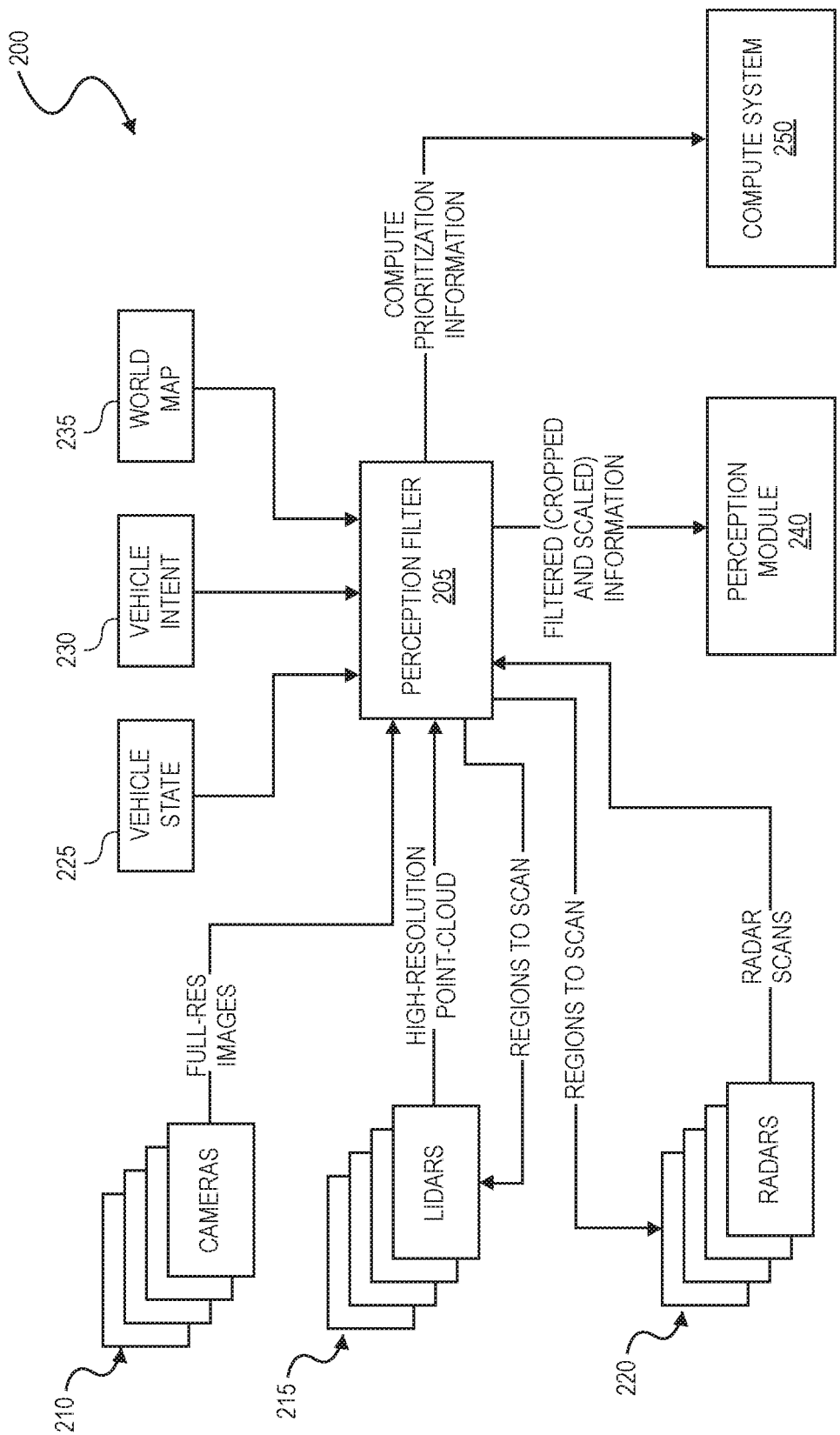
FIG. 2 is a block diagram illustrating an example perception system according to some embodiments of the present disclosure.

Referring now to FIG. 2, illustrated therein is a perception system 200 for an autonomous vehicle, such as the autonomous vehicle 110. Part or all of the perception system 200 may be implemented as a sensor suite, such as the sensor suite 150, and/or an onboard computer, such as onboard computer 145. As shown in FIG. 2, the perception system includes a perception filter 205, which comprises hardware and/or software for processing information and data from a variety of sources, including but not limited to cameras 210, LIDARS 215, RADARs 220, vehicle state 225, vehicle intent 230 (which may be based on/derived from the planned route), and/or world map information 235. As will be described in greater detail below, the perception filter 205 processes the received information/data to filter and scale the information and provides processed/filtered information to a perception module 240, which makes inferences about properties of the physical environment of the autonomous vehicle based on data provided to it (e.g., from the perception filter 205). In particular, the perception module 240 may perform detection and segmentation on the information it receives. Additionally and/or alternatively, the perception filter 205 processes the received information/data and provides compute prioritization information to a compute system 245, which allocates compute resources to devices of the sensor suite (e.g., sensor suite 150). The compute system 245 is the main CPU/GPU compute resource in the vehicle.

Cameras 210 may be implemented using high-resolution imagers with fixed mounting and field of view. LIDARs 215 may be implemented using scanning LIDARs with dynamically configurable field of view that provides a point-cloud of the region intended to scan. RADARs 220 may be implemented using scanning RADARs with dynamically configurable field of view. Vehicle state 225 includes the current position, velocity, and other state(s) of the vehicle. Vehicle intent 230 includes the intent of the vehicle, such as lane change, turning, etc. World map 235 is a high-definition map of the world, which includes semantics and height information.

Figure 3:
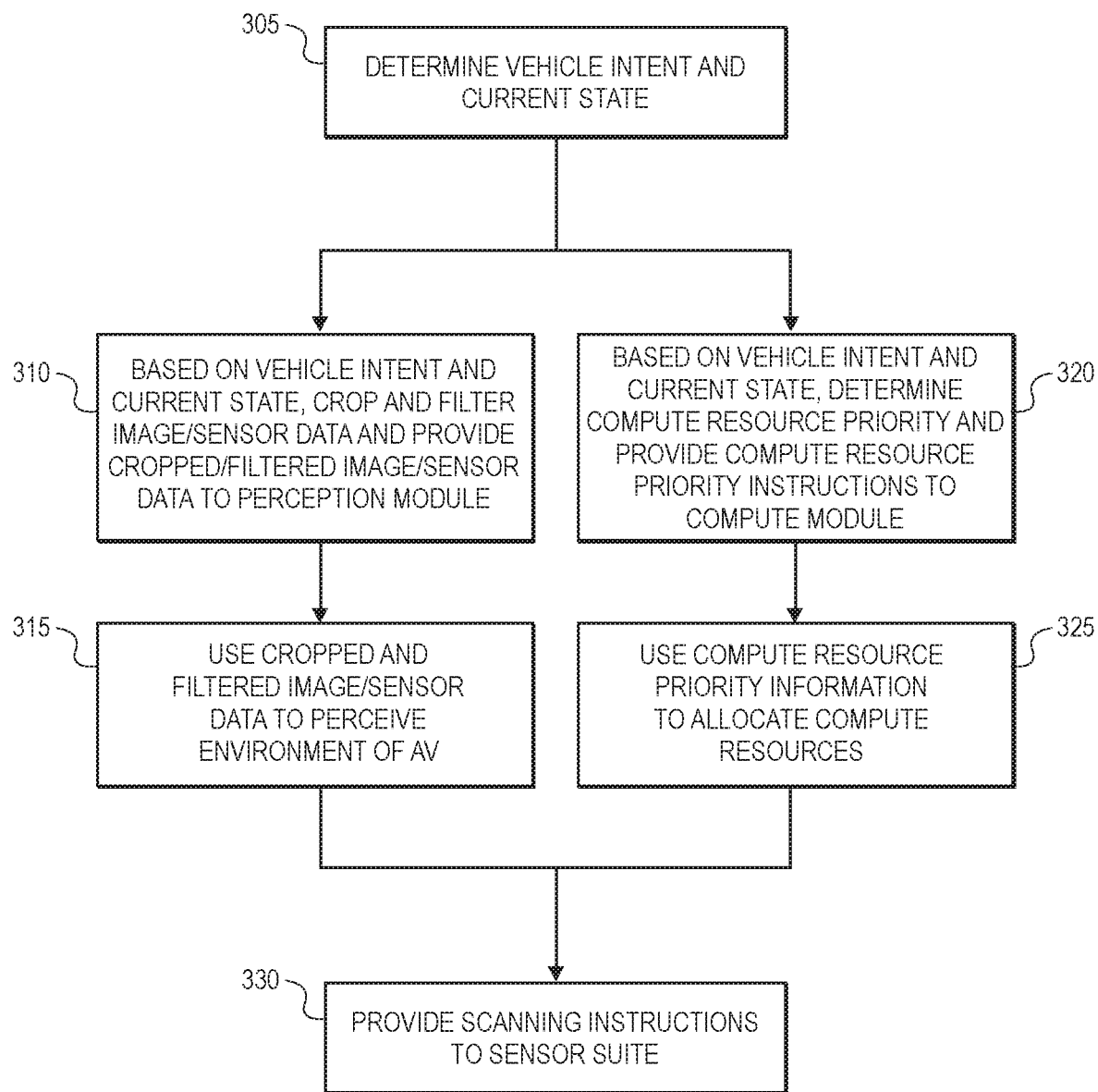
FIG. 3 is a flowchart of an example method implemented by an example perception system according to some embodiments of the present disclosure.

FIG. 3 is a flowchart of an example method 300 implemented by an example perception system according to some embodiments of the present disclosure, such as the perception system 200 of FIG. 2. In step 305, the perception system (e.g., the perception filter) determines the intent of the autonomous vehicle (e.g., using the planned route thereof) and the current state of the autonomous vehicle. In step 310, the perception system (e.g., the perception filter) crops and filters data received from imagers and sensors (e.g., cameras, LIDARs, and RADARs) according to an ROI determined based on the current state and intent of the autonomous vehicle and provides the cropped and filter data to a perception module of the perception system. In step 315, the perception module uses the cropped and filtered data to perceive the environment of the autonomous vehicle and take appropriate action based on the perceived environment, current state, and intent.

Additionally and/or alternatively, in step 320, the perception system (e.g., the perception filter) determines compute resource priority based on ROI and/or current state and intent of the autonomous vehicle and provides compute resource priority instructions to a compute module of the perception system. In step 325, the compute module implements the compute resource priority instructions by allocating resources to the imagers and sensors comprising the sensor suite in accordance with the priority instructions.

It will be recognized that steps 310/315 may be implemented before, after, contemporaneously with, or in lieu of steps 320/325. Similarly, steps 320/325 may be executed before, after, contemporaneously with, or in lieu of steps 310/315. Upon completion of step 315 and/or step 325, in step 330, perception system (e.g., the perception filter) provides scanning instructions to the sensor suite.

Table 1 below provides a non-exhaustive list of example use cases for illustrating operation of embodiments of a perception system such as described herein in accordance with the method 300.

TABLE 1

| EX. | AV INTENT | AV STATE | INSTRUCTIONS TO PERCEPTION MODULE | INSTRUCTIONS TO COMPUTE MODULE | INSTRUCTIONS TO SENSOR SUITE |
|---|---|---|---|---|---|
| 1 | Drive straight on highway at high speed without lane change | Driving straight in its lane | Use high resolution sensor crop from front sensors from region of frame corresponding to the road section for long-range detection. Use scaled sensor information from other sensors for low-range detection. | Prioritize the compute resources for front sensors to keep latency low. | LIDAR and RADAR densely scans the small FOV in front of vehicle corresponding to ROI. Sparse scanning everywhere else. |
| 2 | Make a lane change from left to right lane | Driving straight in its lane | Use high-resolution sensor crops from behind the vehicle for long-range detection. Use scaled sensor information from other sensors for low range detection. | Prioritize the compute resources for rear sensors to keep latency low. | LIDAR and RADAR densely scans the FOV in the area corresponding to ROI. Sparse scanning everywhere else. |
| 3 | Make a right turn | Pointing straight forward waiting to make turn | Use high-resolution sensor information from front and left of vehicle for long-range detection in those regions. Use scaled sensor information from other sensors for low-range detection. | Prioritize the compute resources for left and front sensors to keep latency low. | LIDAR and RADAR densely scans FOV on left and right corresponding to ROIs. Sparse scanning everywhere else. |
| 4 | Drive straight in a residential area at low speed | Driving straight in its lane | Use scaled low-resolution information for low range detection from all sensors. | Apply uniform compute resources. | Uniform scanning everywhere. |

Examples 1-4 listed in Table 1 are illustrated in and will be described in greater detail with reference to FIGS. 4A-4D. Referring to FIG. 4A, which illustrates example 1 from Table 1, a vehicle 400 is driving straight on a highway (relatively high speed) without planning to make a lane change. The image/sensor information provided by the perception filter to the perception module may include a high-resolution sensor crop from a region of the image frame that corresponds to the road section for long-range detection. Additionally, scaled information from other sensors may also be provided for low-range detection in other regions. The compute module may be instructed to prioritize compute resources for forward sensors to keep system latency low. Moreover, LIDAR and RADAR devices are instructed to densely scan the small field of view (FOV) in front of the vehicle corresponding to the region of interest (ROI) and to sparsely scan FOV outside the ROI. In this scenario, the ROI may be represented by an area 405.

Figure 4B:
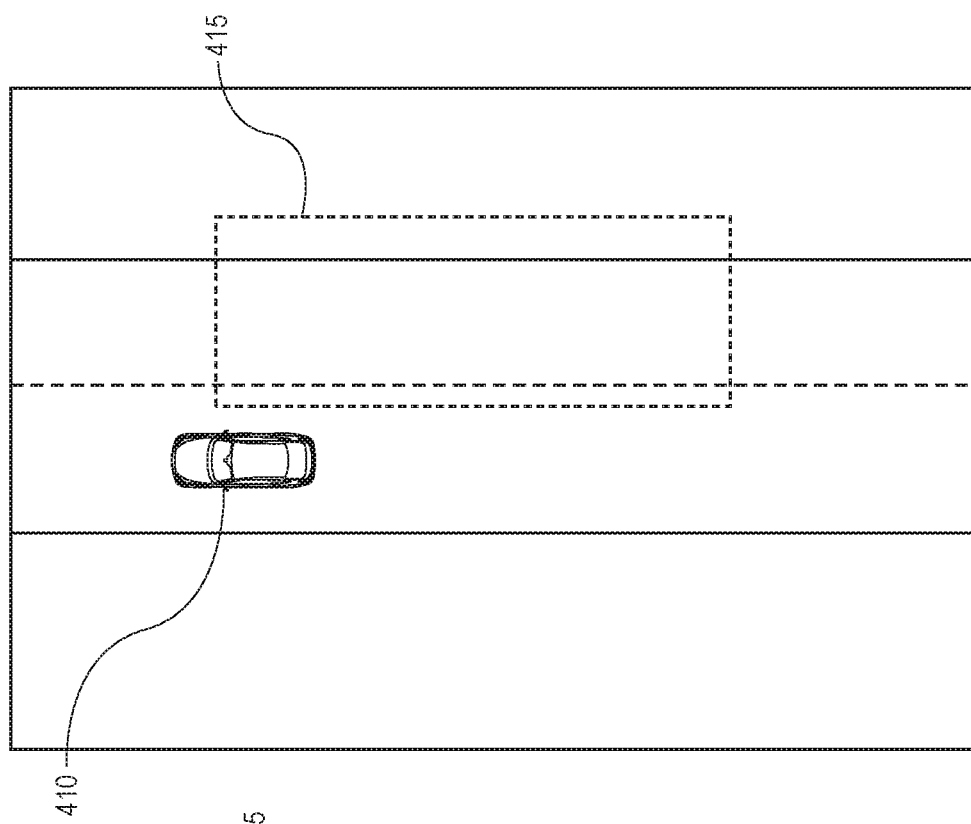
FIGS. 4A-4D illustrate example use cases of an example perception system according to some embodiments of the present disclosure.
Figure 4A:
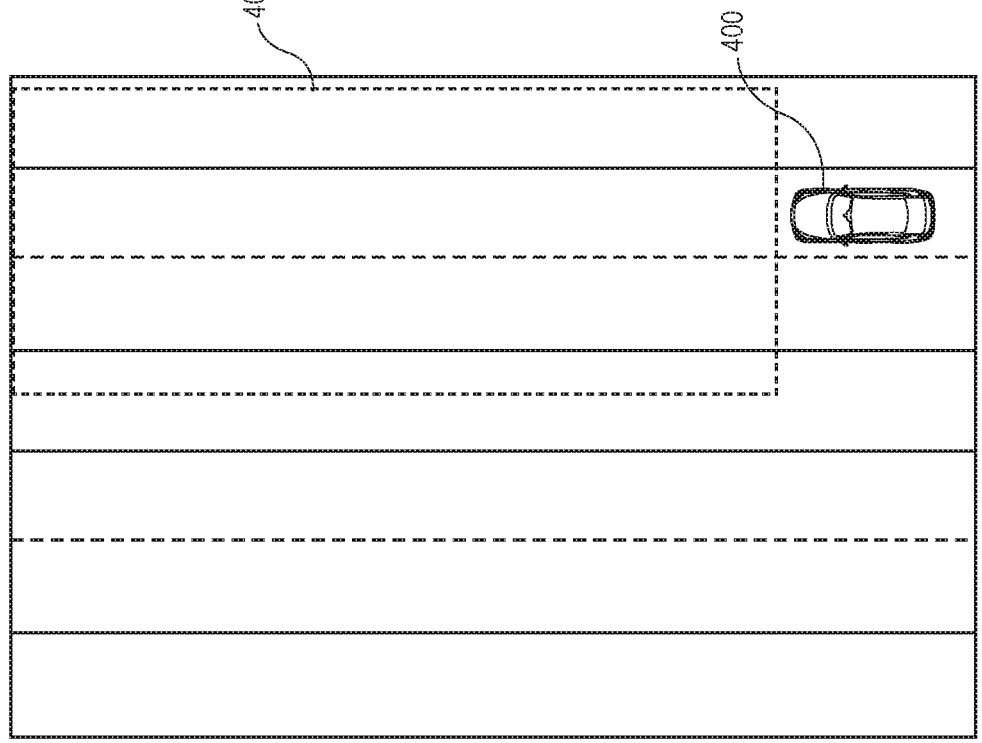

Referring to FIG. 4B, which illustrates Example 2 from Table 1, a vehicle 410 is driving on the highway (relatively high speed) and planning to make a lane change from the left lane to the right lane. The image/sensor information provided by the perception filter to the perception module may include high-resolution sensor crops from behind the vehicle for long-range detection. Additionally, scaled information from other sensors may also be provided for low-range detection in other regions. The compute module may be instructed to prioritize compute resources for rear sensors to keep system latency low. Moreover, LIDAR and RADAR devices are instructed to densely scan the FOV in the area corresponding to the ROI and to sparsely scan FOV outside the ROI. In this scenario, the ROI may be represented by an area 415.

Figure 4C:
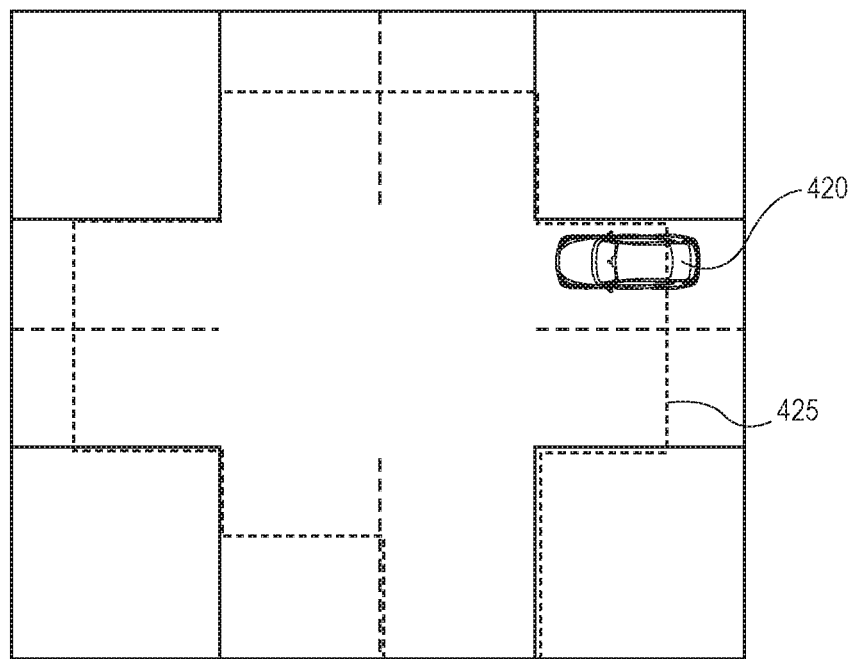

Referring to FIG. 4C, which illustrates Example 3 from Table 1, a vehicle 420 is planning to make a right turn at a residential (relatively low speed) intersection. The image/sensor information provided by the perception filter to the perception module may include high-resolution sensor information from the front and left of the vehicle for long range detection in those regions. Additionally, scaled sensor information from other sensors may also be provided for low-range detection in other regions. The compute module may be instructed to prioritize compute resources for front and left sensors to keep system latency low. Moreover, LIDAR and RADAR devices are instructed to densely scan the FOV on the left and right corresponding to the ROIs and to sparsely scan everywhere else. In this scenario, the ROIs may be represented by an area 425.

Figure 4D:
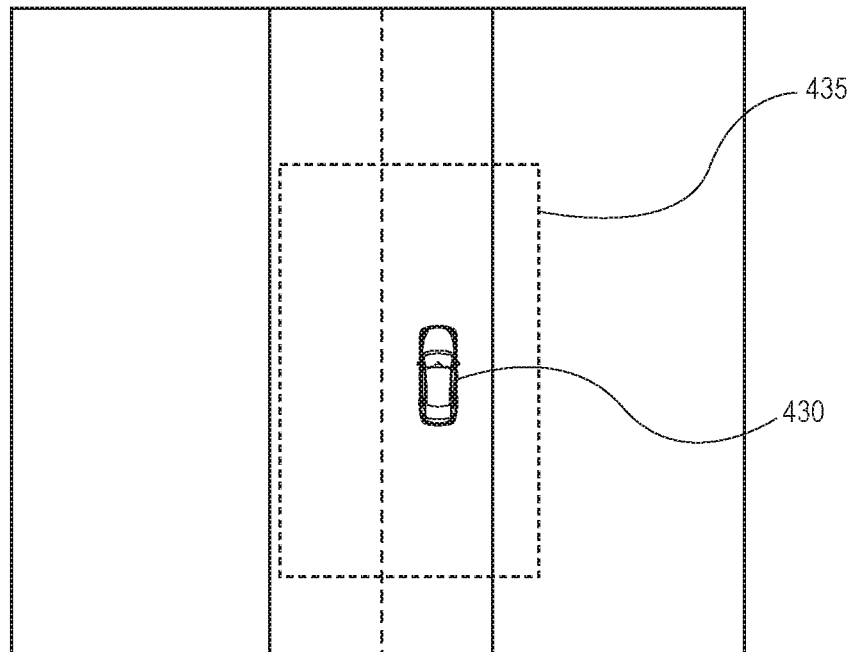

Finally, referring to FIG. 4D, which illustrates Example 4 from Table 1, a vehicle 430 is planning to continue driving straight on a residential street (relatively low speed). The image/sensor information provided by the perception filter to the perception module may include scaled low-resolution information for low-range detection from all sensors. The compute module may be instructed to apply uniform compute resources to all sensors. Moreover, the sensors (e.g., LIDAR and RADAR devices) are instructed to apply uniform scanning everywhere. In this scenario, the ROI may be represented by an area 435.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the FIGS. may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the FIGS. may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the digital filters may be implemented in one or more silicon cores in Application Specific Integrated Circuits (ASICs), Field Programmable Gate Arrays (FPGAs), and other semiconductor chips.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGS. and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

It is also important to note that the functions related to contactless current measurement using magnetic sensors, e.g. those summarized in the one or more processes shown in FIGS., illustrate only some of the possible functions that may be executed by, or within, the current measurement systems illustrated in the FIGS. Some of these operations may be deleted or removed where appropriate, or these operations may be modified or changed considerably without departing from the scope of the present disclosure. In addition, the timing of these operations may be altered considerably. The preceding operational flows have been offered for purposes of example and discussion. Substantial flexibility is provided by embodiments described herein in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. Note that all optional features of the apparatus described above may also be implemented with respect to the method or process described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that is not otherwise reflected in the appended claims.

What is claimed is:

1. A perception system for a vehicle, the perception system comprising:
   a plurality of imaging devices for producing image data comprising images of an environment of the vehicle;

a perception filter for receiving the image data produced by the imaging devices, wherein the perception filter determines compute resource priority instructions based on an intent of the vehicle and a current state of the vehicle received by the perception filter, wherein the intent of the vehicle is based on a planned route of the vehicle and wherein the current state of the vehicle includes at least a current position and a velocity of the vehicle, the perception filter determining a region of interest ("ROI") for the vehicle based on the intent of the vehicle and the current state of the vehicle and wherein the ROI is used by the perception filter to determine the compute resource priority instructions and crop and filter the received image data based on the intent of the vehicle and the current state of the vehicle;

a compute module for receiving the compute resource priority instructions from the perception filter and allocating a greater amount of compute resources to a first one of the imaging devices than to a second one of the imaging devices to enable the first one of the imaging devices to produce higher quality image data than the second one of the imaging devices, wherein the first one of the imaging devices is directed toward and produces images of the ROI and the second one of the imaging devices is not directed toward and does not produce images of the ROI thereby increasing operational quality and decreasing, latency of the perception system; and a perception module for receiving at least one of the cropped and filtered image data from current the perception filter and perceiving the environment of the vehicle based on the received at least one of the cropped and filtered image data;

wherein the vehicle is caused to take appropriate action based on the perceived environment, the current state of the vehicle, and the intent of the vehicle; and wherein the perception filter further provides scanning instructions to at least one of the imaging devices.

2. The perception system of claim 1, wherein the ROI is used by the perception filter to determine a resolution of the selected at least one of the received images of the environment of the vehicle.

3. The perception system of claim 1, wherein the vehicle comprises an autonomous vehicle.

4. The perception system of claim 1, wherein the imaging devices comprise at least one of a camera, a LIDAR device, and a RADAR device.

5. A vehicle comprising:
an onboard computer;
a sensor suite comprising a plurality of sensors and
a perception system including:
a plurality of imaging devices for producing image data comprising images of an environment of the vehicle;
a perception filter for receiving the image data produced by the imaging devices, wherein the perception filter determines compute resource priority instructions based on an intent of the vehicle and a current state of the vehicle received by the perception filter, wherein the intent of the vehicle is based on a planned route of the vehicle and wherein the current state of the vehicle includes at least a current position and a velocity of the vehicle, the perception filter determining a region of interest ("ROI") for the vehicle based on the intent of the vehicle and the current state of the vehicle and wherein the ROI is used by the perception filler to determine the compute resource priority instructions and crop and filter the received image data based on the intent of the vehicle and the current state of the vehicle;

a compute module for receiving the compute resource priority instructions from the perception filter and allocating a greater amount of compute resources to a first one of the imaging devices than to a second one of the imaging devices to enable the first one of the imaging devices to produce higher quality image data than the second one of the imaging devices, wherein the first one of the imaging devices is directed toward and produces images of the ROI and the second one of the imaging devices is not directed toward and does not produce images of the ROI, thereby increasing operational quality and decreasing latency of the perception system; and a perception module for receiving at least one of the cropped and filtered image data from current the perception filter and perceiving the environment of the AV based on the received at least one of the cropped and filtered image data;

wherein the vehicle is caused to take an appropriate action based on the perceived environment, the current state of the vehicle, and the intent of the vehicle; and wherein the perception filter further provides scanning, instructions to at least one of the imaging devices.

6. The vehicle of claim 5, wherein the ROI is used by the perception filter to determine a resolution of the selected at least one of the received images.

7. A method comprising:
deploying a plurality of imaging devices for producing image data comprising images of an environment of a vehicle;

determining a current state of the vehicle and an intent of the vehicle, wherein the intent of the vehicle is based on a planned route of the vehicle and wherein the current state of the vehicle includes at least a current position and a velocity of the vehicle;

receiving by a perception filter the image data produced by the imaging devices, wherein the perception filter determines compute resource priority instructions based on the intent of the vehicle and the current state of the vehicle, the perception filter determining a region of interest ("ROI") for the vehicle based on the intent of the vehicle and the current state of the vehicle and wherein the ROI is used by the perception filter to determine the compute resource priority instructions and crop and filter the received image data based on the intent of the vehicle and the current state of the vehicle;

receiving by a compute module the compute resource priority instructions; and allocating by the compute module compute a greater amount of compute resources to a first one of the imaging devices than to a second one of the imaging devices to enable the first one of the imaging devices to produce higher quality image data than the second one of the imaging devices, wherein the first one of the imaging devices is directed toward and produces images of the ROI and the second one of the imaging devices is not directed toward and does not produce images of the ROI, thereby increasing operational quality and decreasing latency of the perception system;

receiving by a perception module at least one of the cropped and filtered image data from current the perception filter and perceiving the environment of the vehicle based on the received at least one of the cropped and filtered image data;

causing the vehicle to take appropriate action based on the perceived environment, the current state of the vehicle, and the intent of the vehicle; and providing scanning instructions to at least one of the imaging devices.

8. The perception system of claim 1, wherein the current state of the vehicle comprises at least one of a current speed of the vehicle, a current location of the vehicle, and a current direction of travel of the vehicle.

9. The vehicle of claim 5, wherein the current state of the vehicle comprises at least one of a current speed of the vehicle, a current location of the vehicle, and a current direction of travel of the vehicle.

10. The vehicle of claim 5, wherein the vehicle comprises an autonomous vehicle.

11. The vehicle of claim 5, wherein the imaging devices comprise at least one of a camera, a LIDAR device, and a RADAR device.

12. The method of claim 7, wherein the current state of the vehicle comprises at least one of a current speed of the vehicle, a current location of the vehicle, and a current direction of travel of the vehicle.

13. The method of claim 7 further comprising the perception filter using the ROI to determine a resolution of the selected at least one of the received images.

14. The method of claim 7, wherein the vehicle comprises an autonomous vehicle.

15. The method of claim 7, wherein the imaging devices comprise at least one of a camera, a LIDAR device, and a RADAR device.

* * * * *